(12) United States Patent
Tanaka (10) Patent No.: US 10,886,864 B2
(45) Date of Patent: Jan. 5, 2021

(54) MOTOR DRIVING DEVICE AND CONTROL METHOD FOR MOTOR DRIVING DEVICE

(71) Applicants: Kabushiki Kaisha Toshiba, Tokyo (JP); Toshiba Electronic Devices & Storage Corporation, Tokyo (JP)

(72) Inventor: Katsumasa Tanaka, Nagareyama Chiba (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/356,186

(22) Filed: Mar. 18, 2019

(65) Prior Publication Data

US 2020/0091842 A1    Mar. 19, 2020

(30) Foreign Application Priority Data

Sep. 19, 2018  (JP) ................ 2018-174821

(51) Int. Cl.
*H03K 5/00* (2006.01)
*H02P 6/15* (2016.01)
*H02P 6/28* (2016.01)

(52) U.S. Cl.
CPC . *H02P 6/15* (2016.02); *H02P 6/28* (2016.02)

(58) Field of Classification Search
CPC ........ H02P 6/182; H02P 29/097; H02P 6/085; H02P 6/12; H02H 3/08; H02H 7/0838; H02H 7/0855
See application file for complete search history.

(56) References Cited

U.S. PATENT DOCUMENTS

| 7,816,992 | B2 | 10/2010 | Tanaka et al. |
| 2010/0201295 | A1* | 8/2010 | Kuwamura ............ G11B 19/28 |
| | | | 318/400.04 |
| 2017/0089957 | A1* | 3/2017 | Takada ................ H01L 29/7813 |

FOREIGN PATENT DOCUMENTS

| EP | 1667441 B1 | 8/2008 |
| JP | 2005-201716 A | 7/2005 |
| JP | 2007-110811 A | 4/2007 |
| JP | 2008-17358 A | 1/2008 |
| JP | 2008-245397 A | 10/2008 |

* cited by examiner

*Primary Examiner* — Karen Masih
(74) *Attorney, Agent, or Firm* — White & Case LLP (57) ABSTRACT

A motor driving device according to embodiments includes a driving circuit, a controller, and a mask processor. The driving circuit switches, a voltage applied to a motor, according to a switching operation by plural switching elements, for a first switching operation and a second switching operation, and to control driving of the motor. The controller controls the driving circuit on the basis of timing when an electric current flowing to the motor exceeds a predetermined current value. The mask processor sets a predetermined mask time in the switching operation by the control of the driving circuit and enables a change of the predetermined mask time on the basis of at least one of a power supply voltage and the predetermined current value.

20 Claims, 7 Drawing Sheets

MOTOR DRIVING DEVICE AND CONTROL METHOD FOR MOTOR DRIVING DEVICE

CROSS-REFERENCE TO RELATED APPLICATIONS

This application is based upon and claims the benefit of priority from Japanese Patent Application No. 2018-174821, filed on Sep. 19, 2018; the entire contents of which are incorporated herein by reference.

FIELD

Embodiments of the present invention relate to a motor driving device and a control method for the motor driving device.

BACKGROUND

There is known a method of repeating ON and OFF operations of respective elements of a plurality of switching elements and switching a DC voltage applied to a terminal of a motor to thereby control the motor. In such control, to prevent noise that occurs in the repetition of the ON and OFF operations of the plurality of switching elements from adversely affecting the motor, a mask time having a fixed length for disabling the control of the motor is set in a predetermined period including timing when the noise occurs.

A degree of the influence of the noise on the motor changes according to a set current and the like of the motor. When the mask time has the fixed length, the control of the motor is likely to be unstable when the set current of the motor is changed.

DETAILED DESCRIPTION

A motor driving device according to embodiments includes a driving circuit, a controller, and a mask processor. The driving circuit switches, a voltage applied to a motor, according to a switching operation by plural switching elements, for a first switching operation and a second switching operation, and to control driving of the motor. The controller controls the driving circuit on the basis of timing when an electric current flowing to the motor exceeds a predetermined current value. The mask processor sets a predetermined mask time in the switching operation by the control of the driving circuit and enables a change of the predetermined mask time on the basis of at least one of a power supply voltage and the predetermined current value.

First Embodiment

Figure 1:
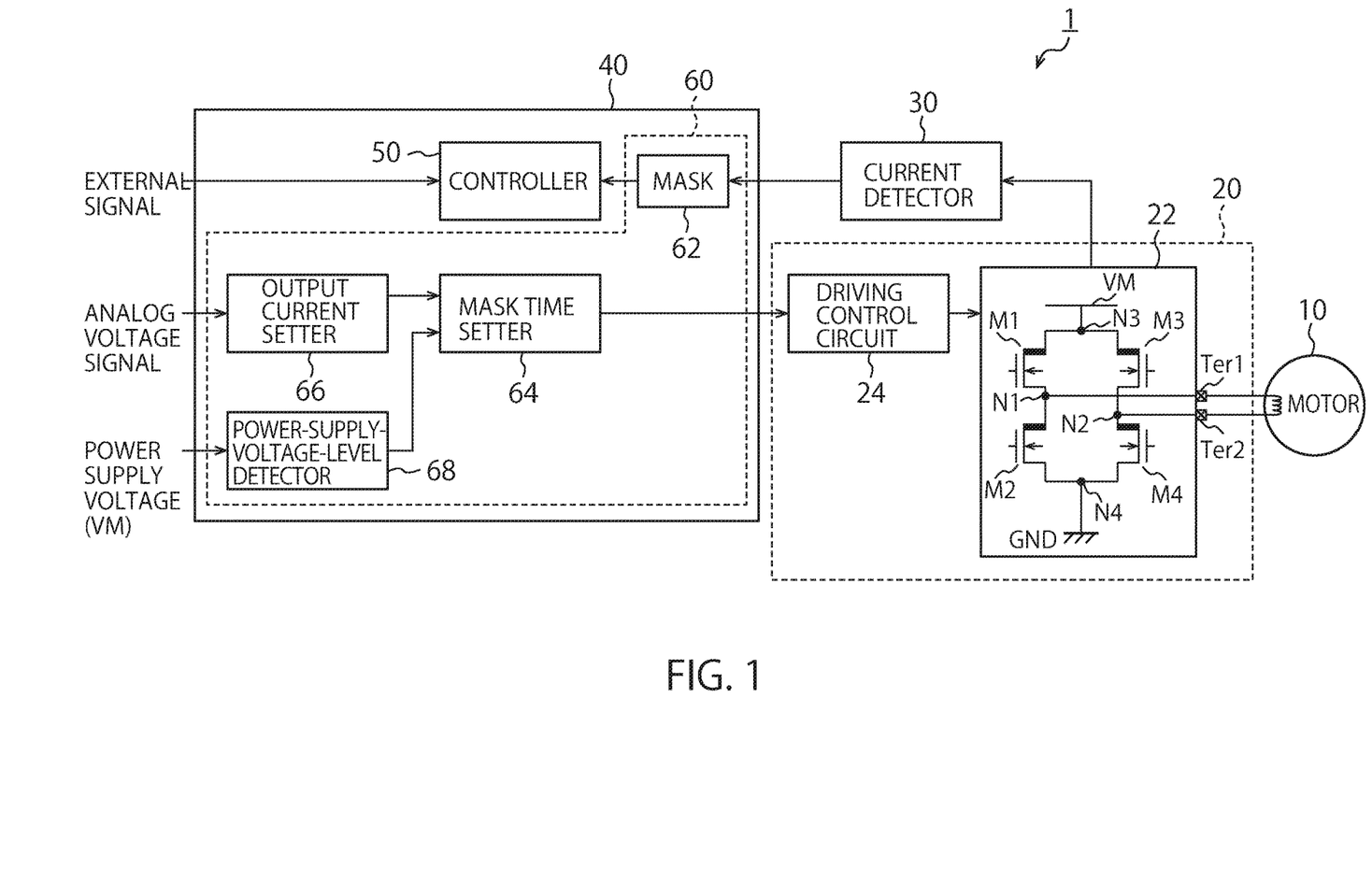
FIG. 1 is a block diagram showing the configuration of a motor driving device according to a first embodiment.

FIG. 1 is a block diagram showing the configuration of a motor driving device 1 according to a first embodiment. As shown in FIG. 1, the motor driving device 1 is a device that drives a motor 10. The motor driving device 1 includes a driving circuit 20, a current detector 30, and a control processor 40.

The driving circuit 20 includes a power conversion circuit 22 and a driving control circuit unit 24. The control processor 40 includes a controller 50 and a mask processor 60 and controls the driving circuit 20. The mask processor 60 includes a mask unit 62, a mask time setter 64, an output current setter 66, and a power-supply-voltage-level detector 68.

Figure 6:
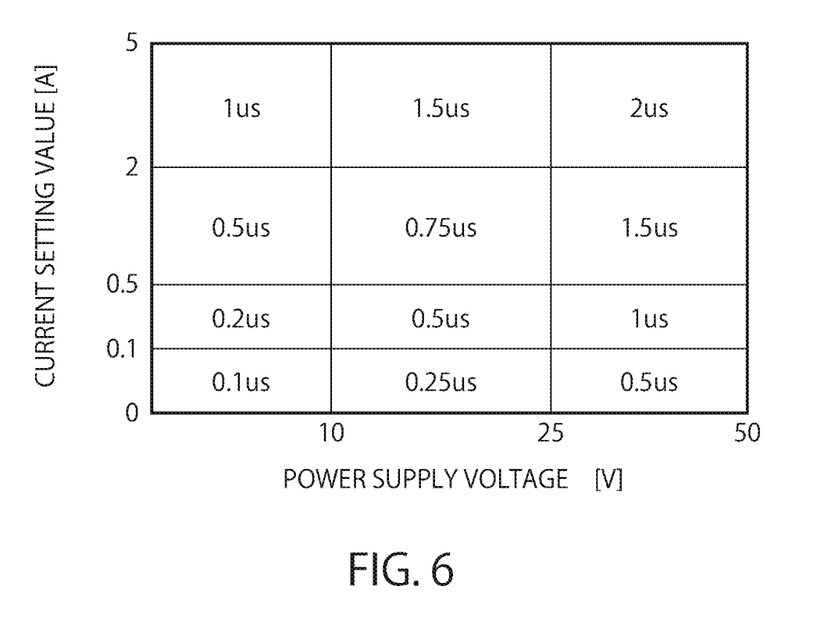
FIG. 6 is a diagram showing an example of a mask time table in a mask time setter.

In FIG. 1, an external signal, an analog voltage signal, and a power supply voltage VM are further illustrated. The external signal is a signal including control information of at least one of a rotating direction and ON and OFF of the motor 10. The analog voltage signal is a signal including information concerning a current setting value (FIG. 6 referred to below). The power supply voltage VM is potential on a high-potential side applied to the driving circuit 20.

The motor 10 is used as, for example, a DC motor or a stepping motor. A driving current is supplied to the motor 10 via terminals Ter1 and Ter2, which are output terminals of the driving circuit 20.

The driving circuit 20 switches DC voltages on a high-potential side and a low-potential side applied between the terminals Ter1 and Ter2 of the motor 10 and drives the motor 10. Details of the driving circuit 20 are explained below.

The current detector 30 detects, via the driving circuit 20, an electric current flowing to the motor 10 and outputs a current signal including information concerning the electric current to the control processor 40. For example, the current detector 30 measures an electric current flowing to a resistor (not shown) disposed between a node N4 of the driving control circuit unit 24 and a ground voltage (a ground) GND, performs AD-conversion on the electric current, and outputs a current signal including information concerning the electric current to the controller 50 of the control processor 40. The ground voltage is usually 0 volt.

The control processor 40 controls the motor 10 via the driving circuit 20 on the basis of the current signal acquired by the current detector 30. That is, the controller 50 controls the motor 10 via the driving circuit 20 according to an external signal. More specifically, the controller 50 controls, on the basis of timing when an electric current flowing to the motor 10 exceeds a predetermined current value, the driving circuit 20 to switch, on a high-potential (VM) side and a low-potential (GND) side, DC voltages applied to the terminals Ter1 and Ter2.

The mask processor 60 disables predetermined control on the driving circuit 20 by the controller 50 during mask times. Details of the configurations of the controller 50 and the mask processor 60 are explained below. That is, the mask times are times for disabling noise that occurs in a switching operation.

The configuration of the driving circuit 20 is explained in detail below.

The power conversion circuit 22 of the driving circuit 20 is configured by connecting four switching elements M1 to M4 in an H-bridge shape. The output terminals Ter1 and Ter2 are connected to a winding of the motor 10. As the switching elements M1 to M4, for example, an IGBT (Insulated Gate Bipolar Transistor), a MOSFET, or a bipolar transistor is used.

More specifically, a first series circuit in which a first high-voltage side switching element M1 and a first low-voltage side switching element M2 are connected in series via a first node N1 and a second series circuit in which a second high-voltage side switching element M3 and a second low-voltage side switching element M4 are connected in series via a second node N2 are connected in parallel. The first node N1 is connected to one end of the motor 10 via the output terminal Ter1. The second node N2 is connected to the other end of the motor 10 via the output terminal Ter2. One end of each of the first high-voltage side switching element M1 and the second high-voltage side switching element M3 is connected to a line on the high-potential side of the power supply voltage VM via a third node N3. One end of each of the first low-voltage side switching element M2 and the second low-voltage side switching element M4 is connected to a ground, which is a line on the low-potential side, via a fourth node N4.

The driving control circuit unit 24 alternates a charging current and a regenerative current and performs control driving of the motor by controlling, according to a control signal from the controller 50 of the control processor 40, ON and OFF of gates of the first high-voltage side switching element M1, the first low-voltage side switching element M2, the second high-voltage side switching element M3, and the second low-voltage side switching element M4.

Figure 2:
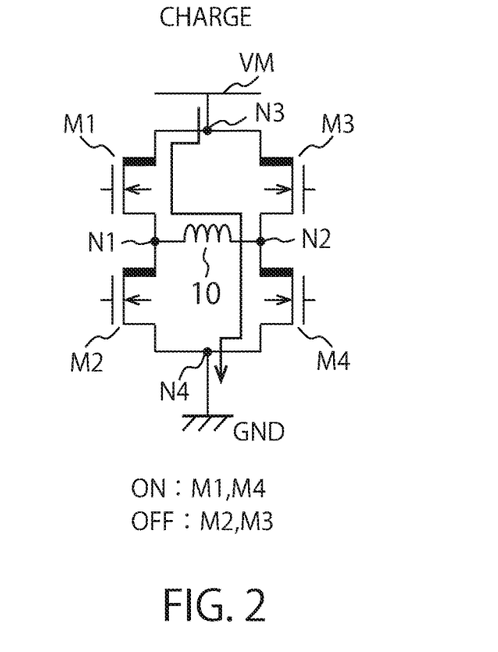
FIG. 2 is a diagram for explaining a first switching operation for feeding a charging current.

FIG. 2 is a diagram for explaining an example of a first switching operation for feeding a charging current. The motor 10 is connected between the nodes N1 and N2. In the first switching operation, the first high-voltage side switching element M1 and the second low-voltage side switching element M4 are connected. The charging current flows from a high-voltage side to a low-voltage side via the switching elements M1 and M4. At this time, the first low-voltage side switching element M2 and the second high-voltage side switching element M3 are disconnected. In this way, the voltage at the node N1 is higher than the voltage at the node N2 in the first switching operation. That is, the voltage at the terminal Ter1 (FIG. 1) is higher than the voltage at the terminal Ter2 (FIG. 1).

Figure 3:
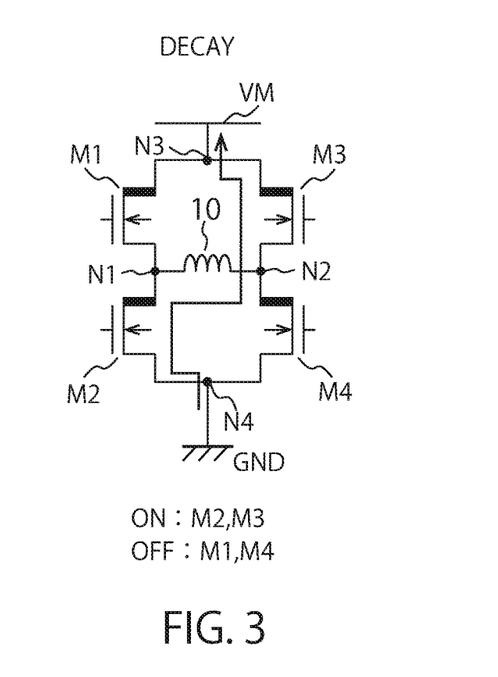
FIG. 3 is a diagram for explaining a second switching operation for feeding a regenerative (decay) current.

FIG. 3 is a diagram for explaining a second switching operation for feeding a regenerative (decay) current. In the second switching operation, the first low-voltage side switching element M2 and the second high-voltage side switching element M3 are connected. The regenerative current flows from the low-voltage side to the high-voltage side via the switching elements M2 and M3. At this time, the first high-voltage side switching element M1 and the second low-voltage side switching element M4 are disconnected. As it is seen from this, the voltage at the node N2 is higher than the voltage at the node N1 in the second switching operation. That is, the voltage at the terminal Ter2 (FIG. 1) is higher than the voltage at the terminal Ter1 (FIG. 1).

As explained with reference to FIGS. 2 and 3, voltages applied to the terminals Ter1 and Ter2 of the motor are controlled and charging and regeneration of the motor are alternated by repeating ON and OFF of the switching elements M1 to M4. Switching the first switching operation and the second switching operation in this way is sometimes called switching of an H bridge.

Figure 4:
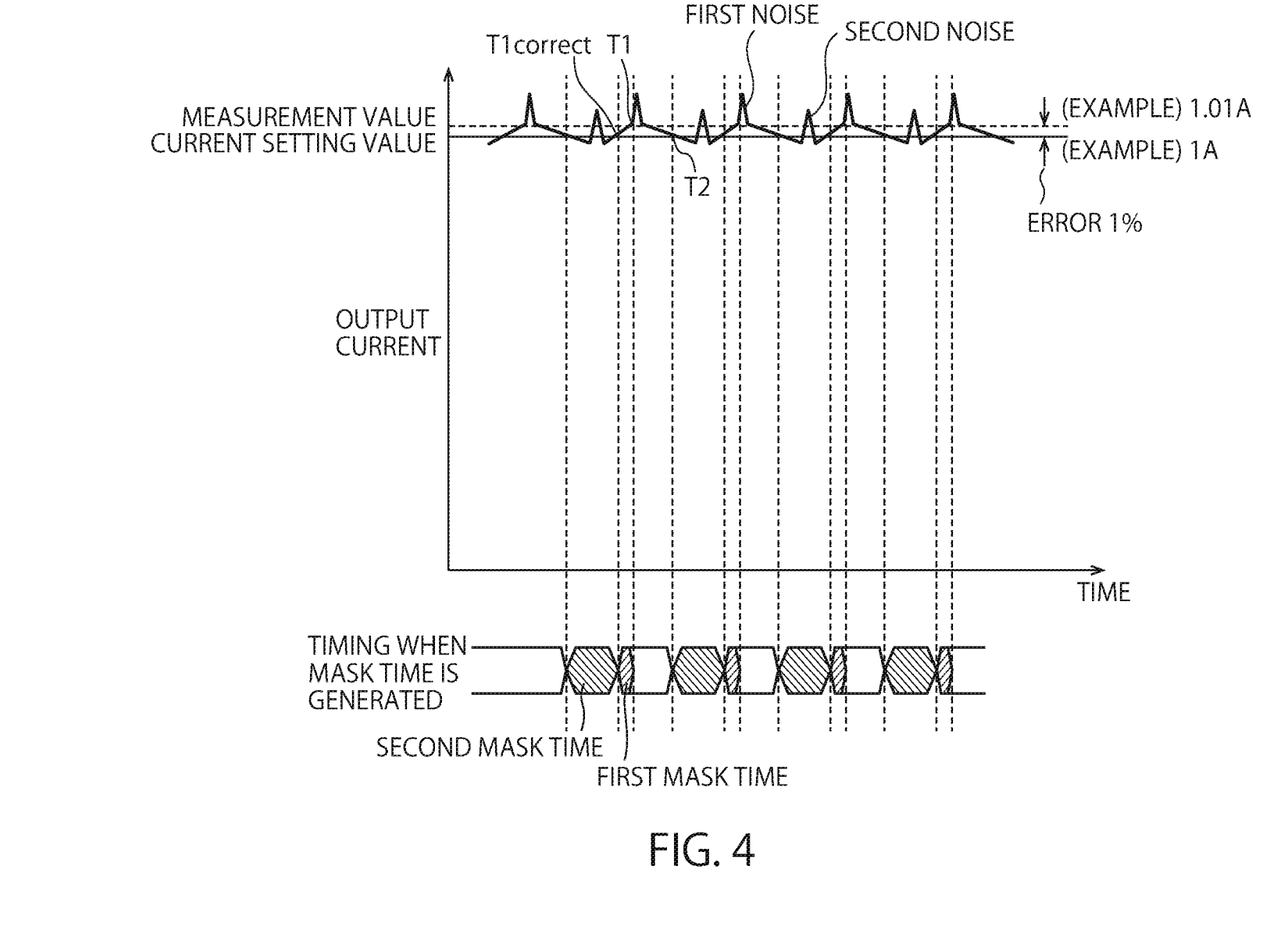
FIG. 4 is a diagram showing a change over time of an output current value in the case of a high current setting value.

FIG. 4 is a diagram showing a change over time of an output current value in the case of a high current setting value. A control example of the controller 50 is explained in detail with reference to FIG. 4. The horizontal axis indicates time and the vertical axis indicates a value of an output current to the motor 10, that is, an electric current detected by the current detector 30. First noise shown in FIG. 4 indicates spike-like noise that occurs when the charging current is switched to the regenerative current. Second noise shown in FIG. 4 indicates spike-like noise that occurs when the regenerative current is switched to the charging current. That is, the first noise indicates spike-like noise that occurs, for example, when the driving circuit 20 switches the first switching operation to the second switching operation. The second noise indicates spike-like noise that occurs, for example, when the driving circuit 20 switches the second switching operation to the first switching operation. Characteristics of the first noise and the second noise change according to the power supply voltage VM supplied to the motor 10 via the driving circuit 20 and a current setting value of an electric current flowing to the motor 10. In particular, a characteristic change of the second noise that occurs when the regenerative current is switched to the charging current is more conspicuous.

A lower part of FIG. 4 shows generation timing of mask times. In a first mask time and a second mask time, control for switching the first switching operation (charging) to the second switching operation (regeneration) is disabled. That is, the first mask time and the second mask time are provided to prevent the spike-like first noise and the spike-like second noise that occur when the H bridge is switched from being transmitted to the controller 50 via the current detector 30 to cause malfunction of the controller 50.

The controller 50 switches, in a time range excluding the first mask time and the second mask time, the first switching operation (charging) to the second switching operation (regeneration) at timing T1 when a current measurement value detected by the current detector 30 exceeds the current setting value. In FIG. 4, T1 correct indicates a point in time when an output current actually exceeds the current setting value. For example, in FIG. 4, the current measurement value exceeds the current setting value at T1correct. Control of the controller 50 for switching the first switching operation to the second switching operation is disabled in the second mask time and the first mask time continuing after the second mask time. Therefore, in a time from T1correct to T1, the first switching operation continues and an increase of the charging current continues. The charging current flowing in the time from T1correct to T1 is called penetrating current.

On the other hand, T2 is timing when the second mask time is started. T2 is set to timing a predetermined time after the timing T1. The second mask time is set on the basis of timing when the second switching operation (regeneration) is switched to the first switching operation (charging). That is, the second mask time is set before and after the timing when the second switching operation is switched to the first switching operation. For example, the timing when the second switching operation is switched to the first switching operation is set in a variable length the predetermined time after the timing T1 when the current measurement value exceeds the current setting value.

In FIG. 4, since the second mask time and the first mask time are continuous, the controller 50 switches the first switching operation to the second switching operation if, when the second mask time and the first mask time have elapsed, the time has reached the timing T1 when the output current reaches the current setting value. If the second mask time and the first mask time are discontinuous, the controller 50 switches the first switching operation to the second switching operation when, after the second mask time, the time has reached the timing T1 when the output current reaches the current setting value. For example, when, during the second mask time and the first mask time, the time reaches the timing T1 when the output current reaches the current setting value, the controller 50 switches the first switching operation to the second switching operation. In this embodiment, length of the second mask time is set on the basis of the power supply voltage VM and the current setting value as explained below with reference to FIG. 6.

When a predetermined time elapses from a point in time when the charging current is switched to the regenerative current, the controller 50 controls the driving circuit 20 to switch the second switching operation (regeneration) to the first switching operation (charging). In this case, even during the second mask time, the controller 50 controls the driving circuit 20 to switch a regeneration-side current to the charging current. That is, when, after an electric current detected by the current detector 30 exceeds the predetermined current value, the predetermined time further elapses from a point in time when the first switching operation is switched to the second switching operation, the controller 50 controls the driving circuit 20 to switch the second switching operation to the first switching operation.

In this way, the controller 50 performs control for, in the time range excluding the first and second mask times, switching the first switching operation to the second switching operation when the electric current flowing to the motor 10 exceeds the predetermined current value and, after a lapse of the predetermined time from a point in time when the first switching operation is switched to the second switching operation, switching the second switching operation to the first switching operation irrespective of the first and second mask times. Time when the second switching operation is switched to the first switching operation may be preset fixed timing irrespective of the timing T1. In this case, a start time T2 of the second mask time is also set as a pre-fixed start time irrespective of the timing T1.

Processing of the mask processor 60 is explained in detail below with reference to FIG. 1 and FIGS. 4 to 6. As shown in FIG. 4, first noise and second noise occur when an electric current is switched. Since the first noise occurs after the electric current exceeds the current setting value, the noise has already exceeded the current setting value. The second noise occurs when the electric current is smaller than the current setting value. However, the second noise sometimes exceeds the current setting value depending on the magnitude of the second noise. When the first and second mask times are absent, the controller 50 performs control for switching the charging current to the regenerative current when one of the first noise and the second noise exceeds the current setting value. Therefore, as explained above, the mask processor 60 sets the mask times according to times when the first noise and the second noise occur. In the first mask time and the second mask time, the control of the controller 50 for switching the first switching operation (charging) to the second switching operation (regeneration) is disabled.

More specifically, even if an electric current detected by the current detector 30 exceeds a predetermined value, in the first mask time having the fixed length, the mask unit 62 of the mask processor 60 disables a current signal output by the current detector 30. Consequently, in the first mask time, the controller 50 cannot perform the processing for switching the first switching operation to the second switching operation. Therefore, it is possible to avoid wrong control due to the influence of the first noise. The mask unit 62 according to this embodiment corresponds to a first mask processor.

In the second mask time as well, the mask unit 62 disables the current signal output by the current detector 30. Therefore, in the second mask time as well, the controller 50 cannot perform the processing for switching the first switching operation to the second switching operation. As shown in FIG. 4, in the first mask time continuing after the second mask time, during the period of the first and second mask times, the controller 50 cannot perform the processing for switching the first switching operation to the second switching operation. Consequently, as explained above, even if the electric current exceeds the current setting value, the charging current is not switched to the regenerative current and the penetrating current is generated.

On the other hand, in this embodiment, as explained with reference to FIG. 6, by making the second mask time variable, the second mask time is set such that the first mask time does not continue after the second mask time. That is, the second mask time and the first mask time are separated to prevent a mask from being applied at the point in time (T1) when the electric current exceeds the current setting value after the elapse of the second mask time. Consequently, at the point in time (T1) when the electric current exceeds the current setting value, the controller 50 can perform the processing for switching the first switching operation to the second switching operation. Therefore, it is possible to prevent the penetrating current.

Figure 5:
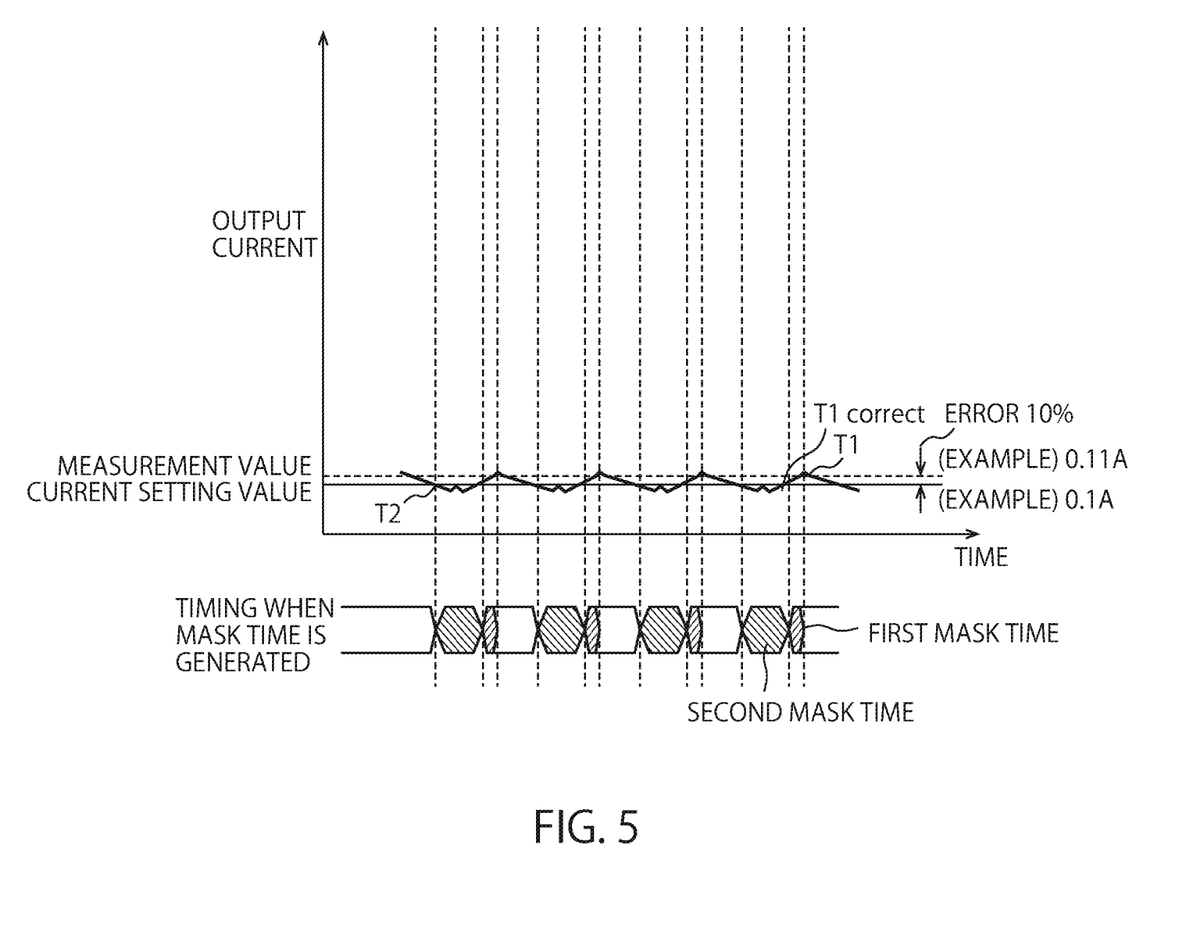
FIG. 5 is a diagram showing a change over time of an output current value in the case of a low current setting value.

FIG. 5 is a diagram showing a change over time of an output current value in the case of a low current setting value. The horizontal axis indicates time and the vertical axis indicates a measurement value of an output current to the motor 10, that is, an electric current detected by the current detector 30. The first mask time and the second mask time have lengths equal to the lengths shown in FIG. 4. As explained above, the first and second mask times are continuous. The point in time of T1 correct is in the range of the second mask time. Therefore, the processing of the controller 50 for switching the first switching operation to the second switching operation is disabled.

Therefore, the penetrating current, which is a continuously flowing charging current, is generated and a current setting value error increases.

As shown in FIG. 5, even when the current setting value is low, in this embodiment, by making the second mask time variable, the second mask time is set such that the first mask time does not continue after the second mask time. Consequently, the second mask time and the first mask time are separated. After the elapse of the second mask time, at the point in time (T1) when the electric current exceeds the current setting value, the controller 50 performs the processing for switching the first switching operation to the second switching operation. Consequently, it is possible to prevent the penetrating current.

The current setting value error is a value obtained by dividing a current value at a switching time of the switching operation in the driving circuit 20 by the current setting value. In FIG. 4, a current value at the switching time T1 of the switching operation is 1.01 amperes. The current setting value is 1 ampere. Therefore, the current setting value error is 1 percent. On the other hand, also in the case of the low current setting value in FIG. 5, the timing T1 is generated after the second mask time elapses. That is, the first mask time and the second mask time are causes of an error with respect to the current setting value. For example, when the current setting value is set to 0.1 A and the penetrating current due to the first mask time and the second mask time is 0.01 A, the error is 10%. In this way, the current setting value error is larger as the current setting value is lower. Therefore, it is important to properly set the mask times. In particular, it is necessary to more accurately set the mask times as the current setting value is lower.

FIG. 6 is a diagram showing an example of a mask time table in the mask time setter 64. The horizontal axis indicates the power supply voltage VM, which is an input signal of the power-supply-voltage-level detector 68. The vertical axis indicates the current setting value (FIGS. 4 and 5) decided on the basis of an analog voltage signal, which is an input signal of the output current setter 66. In this way, the second mask time is decided on the basis of the power supply voltage VM and the current setting value. For example, when the power supply voltage VM is 15 V and the current setting value decided on the basis of the analog voltage signal is 1 A, the second mask time is 0.75 μs. When the current setting value is the same, a peak width of the second noise is larger as the power supply voltage VM is larger. Therefore, when the current setting value is the same, the second mask time is set longer as the power supply voltage VM is larger. When the power supply voltage VM is the same, similarly, the peak width of the second noise is larger as the current setting value is larger. Therefore, when the power supply voltage VM is the same, the second mask time is set longer as the power supply voltage VM is larger. In this way, it is possible to set the second mask time corresponding to the peak width of the second noise by setting the second mask time on the basis of the power supply voltage VM and the current setting value.

As shown in FIG. 6, the mask time setter 64 of the mask processor 60 sets the second mask time on the basis of the second mask time table. In this way, the mask time setter 64 sets the second mask time on the basis of at least one of the power supply voltage VM for supplying the electric current to the motor 10 via the driving circuit 20 and the current setting value of the electric current flowing to the motor 10. The current setting value of the electric current flowing to the motor is set in the mask time setter 64 by the output current setter 66. The power supply voltage VM is set in the mask time setter 64 by the power-supply-voltage-level detector 68. In this way, the output current setter 66 sets the current setting value in the mask time setter 64 on the basis of the analog voltage signal supplied from the outside. The power-supply-voltage-level detector 68 sets the power supply voltage VM supplied from the outside in the mask time setter 64. That is, the mask time setter 64 performs, on the basis of the second mask time, mask processing on the control signal supplied from the controller 50 and outputs the control signal to the driving circuit 20. For example, the mask time setter 64 performs, in the second mask time, processing for stopping a clock and not changing a signal output to the driving circuit 20. Consequently, the controller 50 can avoid wrong control due to the influence of the second noise even if the second noise occurs in the switching from the second switching operation to the first switching operation in the second mask time.

The mask time setter 64 is configured by a programmable circuit and is capable of changing the second mask time based on a power supply voltage and a current setting value. Consequently, it is possible to flexibly adjust the second mask time according to a use. The mask time setter 64 may linearly change and set the second mask time with respect to a setting value of the output current setter 66 or the power-supply-voltage-level detector 68. Consequently, it is possible to reduce a current setting value error in an entire current region.

Figure 7:
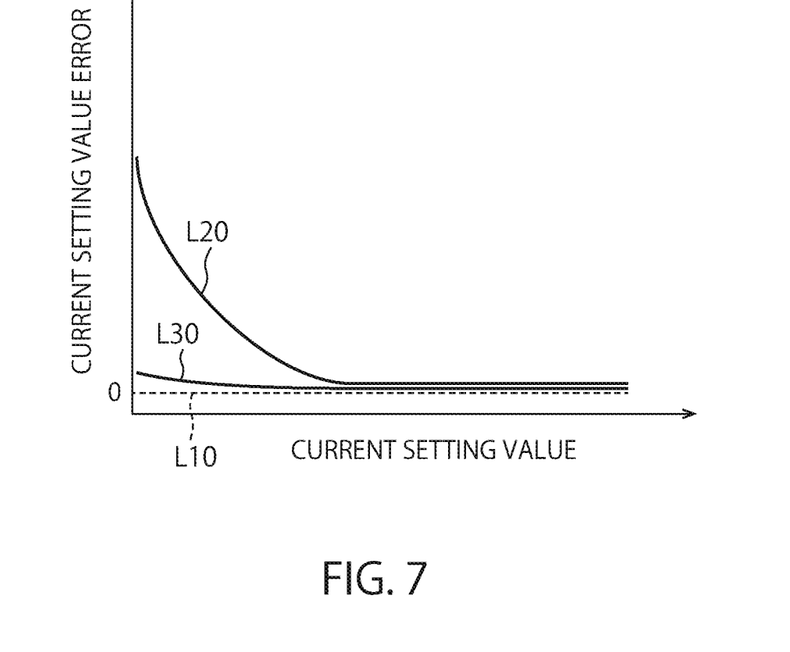
FIG. 7 is a diagram for explaining an effect of using the mask time table in the mask time setter.

FIG. 7 is a diagram for qualitatively explaining an effect achieved when the mask time table of the mask time setter is used. The horizontal axis indicates a current setting value. The vertical axis indicates a current setting value error. L10 indicates an ideal case in which the error is zero. On the other hand, L20 indicates a current setting value error in the case in which the second mask time is set to a fixed value as a comparative example. L30 indicates a current setting value error in the case of this embodiment in which the second mask time is set to a variable length. As shown in FIG. 7, by changing the second mask time on the basis of the power supply voltage and the current setting value, the second mask time and the first mask time are prevented from being continuous and the first switching operation is switched to the second switching operation at a point in time when the electric current exceeds the current setting value. That is, it is seen that the current setting value error is reduced. In particular, as the current setting value is lower, the current setting value error is further reduced.

For example, the point in time of T1 correct (the point in time when the electric current exceeds the current setting value) in FIG. 5 is not included in the second mask time by further reducing the second mask time. Consequently, it is possible to switch the charging current to the regenerative current at timing when the electric current flowing in the motor 10 exceeds the current setting value. It is possible to prevent the penetrating current. Therefore, the current setting value error is reduced. In this way, the mask time setter 64 is capable of setting an appropriate mask time for noise due to the operation of the motor 10 on the basis of the current setting value by the output current setter 66 and the power supply voltage VM by the power-supply-voltage-level detector 68. It is possible to reduce the current setting value error.

As explained above, according to this embodiment, the second mask time in performing the control for switching the regenerative current to the charging current is changed on the basis of the power supply voltage VM and the current setting value of the electric current flowing to the motor 10. Consequently, it is possible to cope with a characteristic change of the second noise that occurs when the power supply voltage VM, the current setting value, and the like are changed. It is possible to set the second mask time in a range corresponding to an occurrence time of the second noise. Therefore, it is possible to reduce the second mask time according to the occurrence time of the second noise. It is possible to prevent timing when the electric current flowing in the motor 10 exceeds the current setting value from falling within the second mask time, and the penetrating current is prevented. It is possible to reduce the current setting value error.

Second Embodiment

Figure 8:
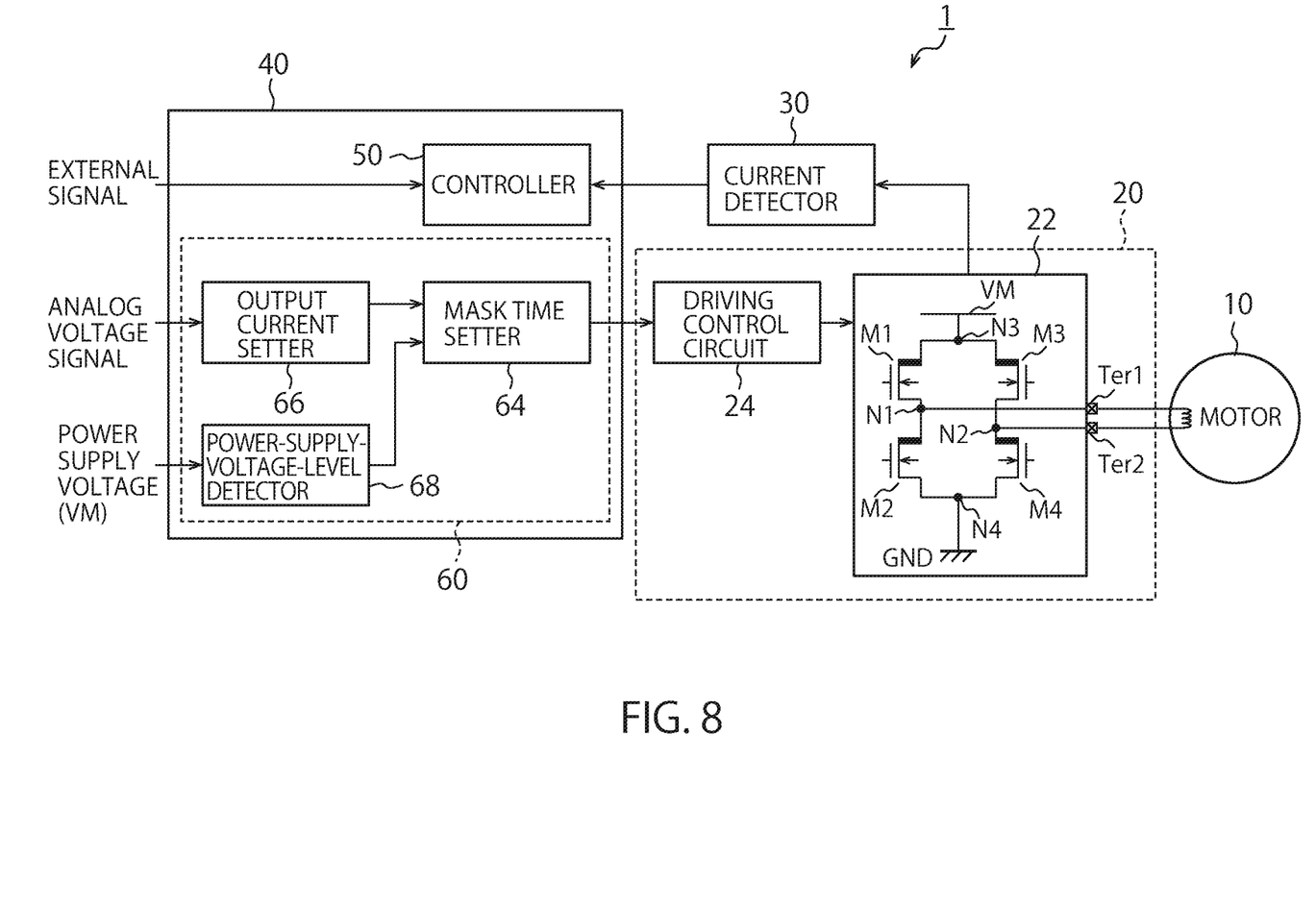
FIG. 8 is a block diagram showing the configuration of a motor driving device according to a second embodiment.

FIG. 8 is a block diagram showing the configuration of a motor driving device according to a second embodiment. A mask time setter 74 according to the second embodiment is different from the mask time setter 64 according to the first embodiment in that the mask time setter 74 sets the first mask time as well. The difference from the first embodiment is explained below. The other components are equivalent to the components of the motor driving device 1 according to the first embodiment. Therefore, the same components are denoted by the same reference numerals and explanation of the components is omitted.

Figure 9:
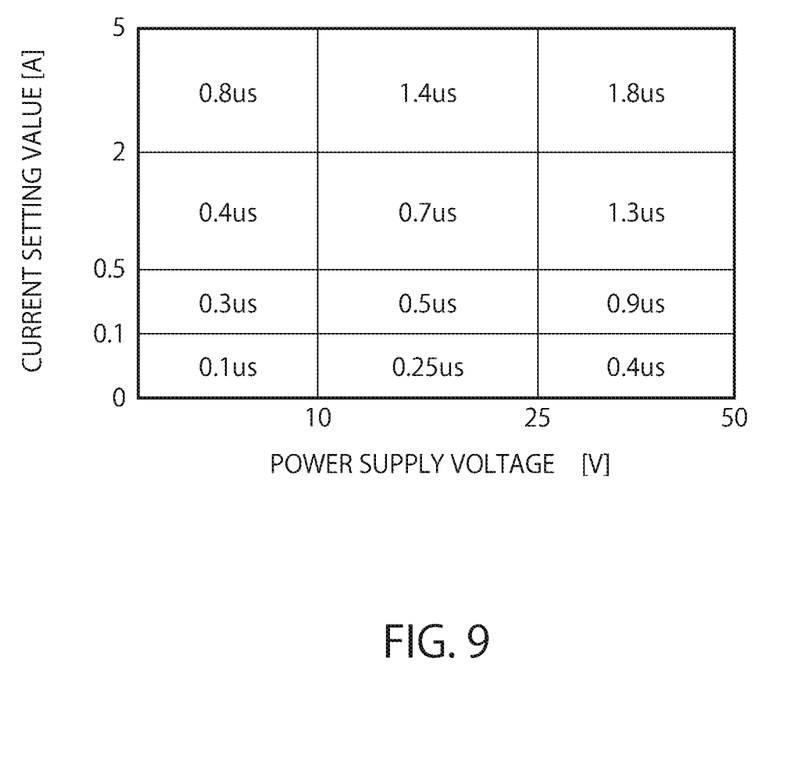
FIG. 9 is a diagram showing another example of the mask time table in a mask time setter.

FIG. 9 is a diagram showing another example of the mask time table in the mask time setter 74. The horizontal axis indicates the power supply voltage VM, which is an input signal of the power-supply-voltage-level detector 68. The vertical axis indicates the current setting value (FIGS. 4 and 5) decided on the basis of an analog voltage signal, which is an input signal of the output current setter 66. For example, when the power supply voltage VM is 15 V and the current setting value decided on the basis of the analog voltage signal is 1 A, the first mask time is 0.7 µS.

In this way, the mask time setter 74 according to the second embodiment is different from the mask time setter 64 according to the first embodiment in that the mask time setter 74 further includes the first mask time table for setting the first mask time. That is, as shown in FIG. 9, the mask time setter 74 changes the first mask time as well on the basis of the first mask time table. In this way, in the first mask time having the variable length from the point in time when the electric current detected by the current detector 30 exceeds the predetermined current value and the second mask time having the variable length based on the point in time when the electric current exceeds the predetermined current value, the mask time setter 74 disables a control signal of the controller 50 for switching the first switching operation to the second switching operation. The mask time setter 74 according to this embodiment corresponds to a third mask processor.

More specifically, the current setting value of the electric current flowing to the motor is set in the mask time setter 74 by the output current setter 66. The power supply voltage VM is set in the mask time setter 74 by the power-supply-voltage-level detector 68. Consequently, the mask time setter 74 sets, using the first mask time table for setting the first mask time, the first mask time on the basis of at least one of the power supply voltage VM for supplying the electric current to the motor 10 via the driving circuit 20 and the current setting value of the electric current flowing to the motor 10.

As explained above, according to this embodiment, it is possible to change, on the basis of the power supply voltage VM and the current setting value of the electric current flowing to the motor 10, the first mask time in switching the charging current to the regenerative current. Consequently, it is possible to set the first mask time in the range corresponding to the occurrence time of the first noise, and control operation is more stabilized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A motor driving device comprising:
a driving circuit configured to switch a voltage applied to a motor, according to a switching operation by plural switching elements, for a first switching operation and a second switching operation, and to control driving of the motor;
a controller configured to control the driving circuit based on timing when an electric current flowing to the motor exceeds a predetermined current value; and
a mask processor configured to set a predetermined mask time in the switching operations by the control of the driving circuit, wherein
the mask processor configured to enable a change of the predetermined mask time based on at least one of the voltage and the predetermined current value.

2. The motor driving device according to claim 1, wherein the predetermined mask time is a time for disabling noise that occurs in the switching operation.

3. The motor driving device according to claim 1, wherein the driving circuit includes, between a high-potential side line for applying the voltage and a low-potential side line, a power conversion circuit having a first series circuit and a second series circuit, the first series circuit connecting a first high-voltage side switching element and a first low-voltage side switching element in series via a first node and the second series circuit connecting a second high-voltage side switching element and a second low-voltage side switching element in series via a second node, the first series circuit and the second series circuit are connected in parallel, one end of the motor is connected to the first node, and another end of the motor is connected to the second node,
in the first switching operation, the first high-voltage side switching element and the second low-voltage side switching element are connected and the first low-voltage side switching element and the second high-voltage side switching element are disconnected, and
in the second switching operation, the first high-voltage side switching element and the second low-voltage side switching element are disconnected and the first low-voltage side switching element and the second high-voltage side switching element are connected.

4. The motor driving device according to claim 1, wherein the controller switches the first switching operation to the second switching operation when the electric current flowing to the motor exceeds the predetermined current value and switches the second switching operation to the first switching operation a predetermined time after a point in time when the first switching operation is switched to the second switching operation.

5. The motor driving device according to claim 3, wherein the driving circuit further includes a driving control circuit configured to, according to the control by the controller, drive control of the connection and the disconnection of the first high-voltage side switching element, the first low-voltage side switching element, the second high-voltage side switching element, and the second low-voltage side switching element.

6. The motor driving device according to claim 1, further comprising a current detector configured to detect an electric current flowing to the motor and output a current signal including information concerning the electric current to the controller, wherein
the mask processor includes:
a first mask processor configured to disable the current signal in a first mask time having a fixed length from a point in time when the electric current exceeds the predetermined current value; and
a second mask processor configured to disable, in a second mask time having a variable length based on the point in time when the electric current exceeds the predetermined current value, a control signal output to the driving circuit by the controller.

7. The motor driving device according to claim 1, wherein the mask processor disables, in a first mask time having a variable length from a point in time when the electric current exceeds the predetermined current value and a second mask time having a variable length based on the point in time when the electric current exceeds the predetermined current value, a control signal output to the driving circuit by the controller.

8. The motor driving device according to claim 1, wherein the mask processor extends the mask time according to an increase in the voltage when the predetermined current value is same.

9. The motor driving device according to claim 1, wherein the mask processor extends the mask time according to an increase in the predetermined current value when the voltage is same.

10. The motor driving device according to claim 1, wherein the mask processor sets the mask time in switching the first switching operation to the second switching operation to a fixed length.

11. The motor driving device according to claim 1, wherein the mask processor starts the mask time based on a point in time when the electric current flowing to the motor exceeds the predetermined current value.

12. The motor driving device according to claim 1, wherein the mask processor sets the mask time based on a mask time table based on the voltage and the predetermined current value.

13. The motor driving device according to claim 1, wherein the mask processor is configured by a programmable circuit and is capable of changing length of the mask time set in a mask time table.

14. A motor device comprising:
a motor;
a driving circuit unit configured to switch, according to a switching operation of a plurality of switching elements, in a first switching operation and a second switching operation, a voltage applied to the motor and perform control driving of the motor;
a controller configured to control the driving circuit unit based on timing when an electric current flowing to the motor exceeds a predetermined current setting value; and
a mask processor configured to set a predetermined mask time in the switching operation by the control of the driving circuit unit, wherein
the mask processor enables a change of the predetermined mask time based on at least one of the voltage and the predetermined current setting value.

15. The motor device according to claim 14, wherein the predetermined mask time is a time for disabling noise that occurs in the switching operation.

16. The motor device according to claim 14, wherein
the driving circuit unit includes, between a high-potential side line for applying the voltage and a low-potential side line, a power conversion circuit unit in which a first series circuit in which a first high-voltage side switching element and a first low-voltage side switching element are connected in series via a first node and a second series circuit in which a second high-voltage side switching element and a second low-voltage side switching element are connected in series via a second node are connected in parallel, one end of the motor is connected to the first node, and another end of the motor is connected to the second node,
in the first switching operation, the first high-voltage side switching element and the second low-voltage side switching element are connected and the first low-voltage side switching element and the second high-voltage side switching element are disconnected, and
in the second switching operation, the first high-voltage side switching element and the second low-voltage side switching element are disconnected and the first low-voltage side switching element and the second high-voltage side switching element are connected.

17. The motor device according to claim 14, wherein the controller switches the first switching operation to the second switching operation when the electric current flowing to the motor exceeds the predetermined current setting value and switches the second switching operation to the first switching operation a predetermined time after a point in time when the first switching operation is switched to the second switching operation.

18. The motor device according to claim 16, wherein the driving circuit unit further includes a driving control circuit unit configured to perform, according to the control by the controller, driving control of the connection and the disconnection of the first high-voltage side switching element, the first low-voltage side switching element, the second high-voltage side switching element, and the second low-voltage side switching element.

19. The motor device according to claim 14, further comprising a current detector configured to detect an electric current flowing to the motor and output a current signal including information concerning the electric current to the controller, wherein
the mask processor includes:
a first mask processor configured to disable the current signal in a first mask time having a fixed length from a point in time when the electric current exceeds the predetermined current setting value; and
a second mask processor configured to disable, in a second mask time having a variable length based on the point in time when the electric current exceeds the predetermined current setting value, a control signal output to the driving circuit unit by the controller.

20. The motor device according to claim 14, wherein the mask processor disables, in a first mask time having a variable length from a point in time when the electric current exceeds the predetermined current setting value and a second mask time having a variable length based on the point in time when the electric current exceeds the predetermined current setting value, a control signal output to the driving circuit unit by the controller.

* * * * *